(12) United States Patent
Singh et al.

(10) Patent No.: US 7,896,247 B2
(45) Date of Patent: Mar. 1, 2011

(54) SECURE USE OF EXTERNALLY STORED DATA

(75) Inventors: Ravi Singh, Mississauga (CA); Neil Patrick Adams, Kitchener (CA); Richard Paul Sibley, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 47 days.

(21) Appl. No.: 12/325,582

(22) Filed: Dec. 1, 2008

(65) Prior Publication Data

US 2010/0133342 A1   Jun. 3, 2010

(51) Int. Cl.
*G06K 7/00* (2006.01)
*G06K 7/08* (2006.01)
*G06K 19/00* (2006.01)
*G06K 19/06* (2006.01)

(52) U.S. Cl. .......... 235/439; 235/435; 235/487; 235/492

(58) Field of Classification Search .................. None
See application file for complete search history.

(56) References Cited

U.S. PATENT DOCUMENTS

| | | | |
|---|---|---|---|
| 6,816,058 B2 | 11/2004 | McGregor et al. | |
| 6,997,381 B2 | 2/2006 | Arnouse | |
| 7,303,120 B2 | 12/2007 | Beenau et al. | |
| 7,314,164 B2 | 1/2008 | Bonalle et al. | |
| 7,314,165 B2 | 1/2008 | Bonalle et al. | |
| 7,318,550 B2 | 1/2008 | Bonalle et al. | |
| 2003/0046573 A1* | 3/2003 | Bender et al. | 713/200 |
| 2003/0183691 A1* | 10/2003 | Lahteenmaki et al. | 235/441 |
| 2004/0065734 A1* | 4/2004 | Piikivi | 235/451 |
| 2004/0143551 A1* | 7/2004 | Jong | 705/64 |
| 2006/0095598 A1* | 5/2006 | Prevost et al. | 710/10 |
| 2007/0245157 A1 | 10/2007 | Giobbi et al. | |

FOREIGN PATENT DOCUMENTS

| EP | 1933523 A1 | 6/2008 |
|---|---|---|
| WO | 03039092 A2 | 5/2003 |

OTHER PUBLICATIONS

European Extended Search Report relating to Application No. 08170405.8 dated May 12, 2009.
Spectre Online, Fingerprint Smart Card Reader BioEntry Smart, Spectre Communication Data & Positioning, 2008, United Kingdom, http://www.spectre-online.co.uk/products/biometrics/finger_print/module....
Futronic Technology Company Limited, Futronic releases USB Biometric Smart Card Reader for Two-Factors Authentication, Mar. 8, 2006, Hong Kong, http://www.futronic.com.hk/news_080306.html.
Precise Biometrics, Specifications Precise 100 MC Combined Fingerprint and smart card reader for computer security, Sweden, www.precisebiometrics.com.
Thomasnet Productnewsroom Powered by Product News Network, Smart Card Reader features ExpressCard (TM) interface., Jun. 28, 2006, Thomas Publishing Company, 2007, http://news.thomasnet.com/printready.html?prid=488643.

* cited by examiner

*Primary Examiner* — Michael G Lee
*Assistant Examiner* — Matthew Mikels
(74) *Attorney, Agent, or Firm* — Ridout & Maybee LLP

(57) ABSTRACT

A smart card reader is adapted to extract and store authentication data from a response APDU received from a smart card before generating a filtered response APDU, wherein the filtered response APDU does not include the authentication data. Beneficially, when the smart card reader transmits the filtered response APDU toward a destination, the biometric template data is less susceptible to interception, thereby providing a more secure solution.

12 Claims, 8 Drawing Sheets

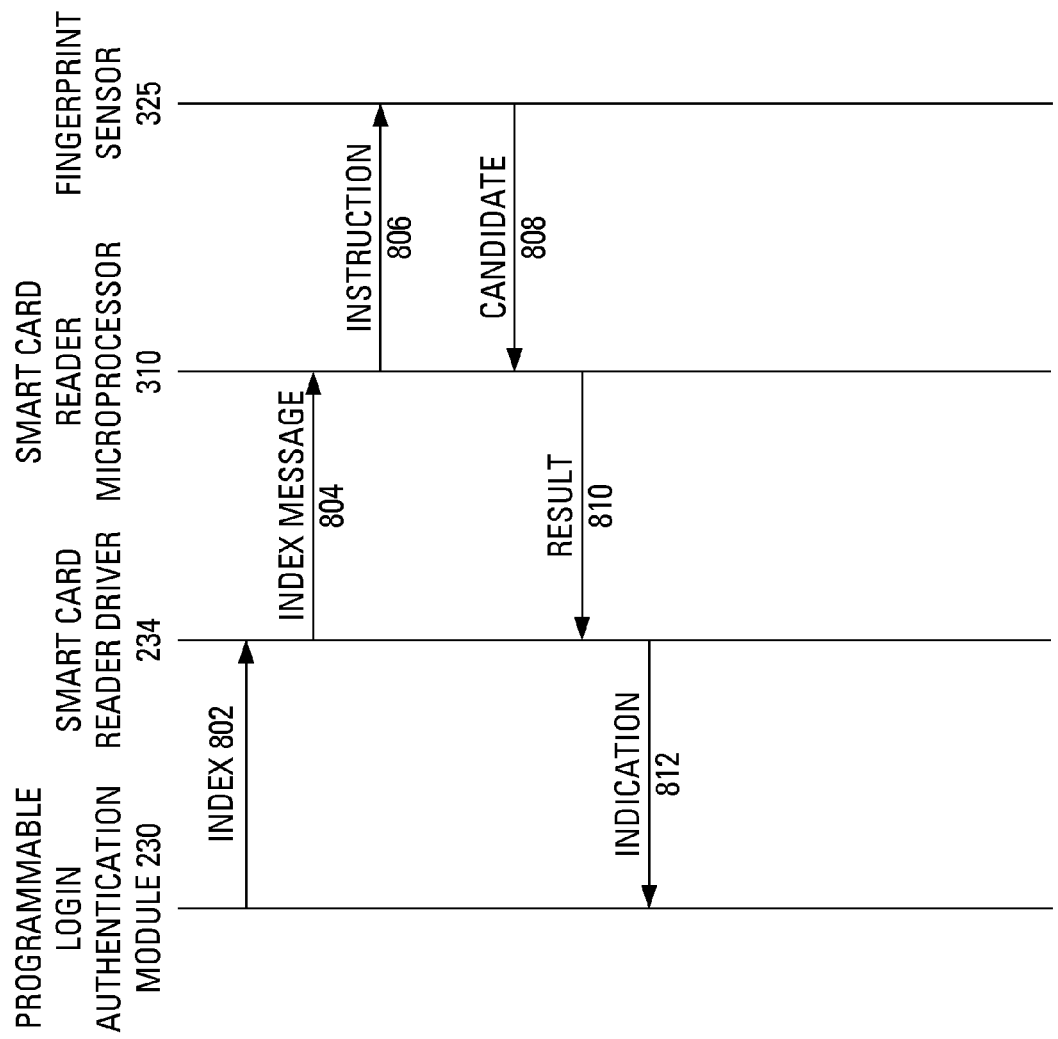

SECURE USE OF EXTERNALLY STORED DATA

FIELD OF THE INVENTION

The present application relates generally to authentication of access to a device and, more specifically, to the secure use of externally stored data to authenticate the access to the device.

BACKGROUND OF THE INVENTION

Computing devices, which have been ubiquitous for years, are increasingly becoming critical tools to professionals and employees at all levels and in all positions. Government employees, researchers, law enforcement, national security and intelligence officers, and military personnel rely heavily on technology to perform their jobs. However, people in these roles must be able to rely on their computing devices to provide a secure system of information storage that is not susceptible to intrusion by outsiders or unauthorized users. Biometric authentication is often considered for providing secure access to computing devices in use by people in such roles.

Biometric authentication relates to automatically and uniquely recognizing humans based upon one or more intrinsic physical or behavioral traits. Biometric authentication often involves technologies that measure and analyze human physical and behavioral characteristics. Examples of physical characteristics include fingerprints, retinas, irises, facial patterns and hand measurements, while examples of mostly behavioral characteristics include signature, gait and typing patterns. Voice is considered a mix of both physical and behavioral characteristics.

To obtain access to a secure device, a user provides a candidate physical characteristic (a biometric candidate). Authenticating the user involves comparing the biometric candidate to a previously recorded, corresponding biometric template. To facilitate this comparison, the previously recorded, corresponding biometric entry may be digitized and stored as the biometric template. Additionally, collection of a biometric candidate from the user involves obtaining a digital representation of one or more physical characteristics of the user.

In many instances, the device that obtains a biometric candidate is different from the device that uses the biometric candidate to authenticate a user and these devices may be distinct from a further device that stores biometric templates necessary for comparison during authentication.

BRIEF DESCRIPTION OF THE DRAWINGS

Reference will now be made to the drawings, which show, by way of example, embodiments of the present disclosure, and in which:

FIG. 8 illustrates message flow in a novel exchange of messages among components of the PC and the smart card reader of FIG. 1, where the message flow is directed to authenticating a potential user of the PC.

DETAILED DESCRIPTION OF THE EMBODIMENTS

Figure 1:
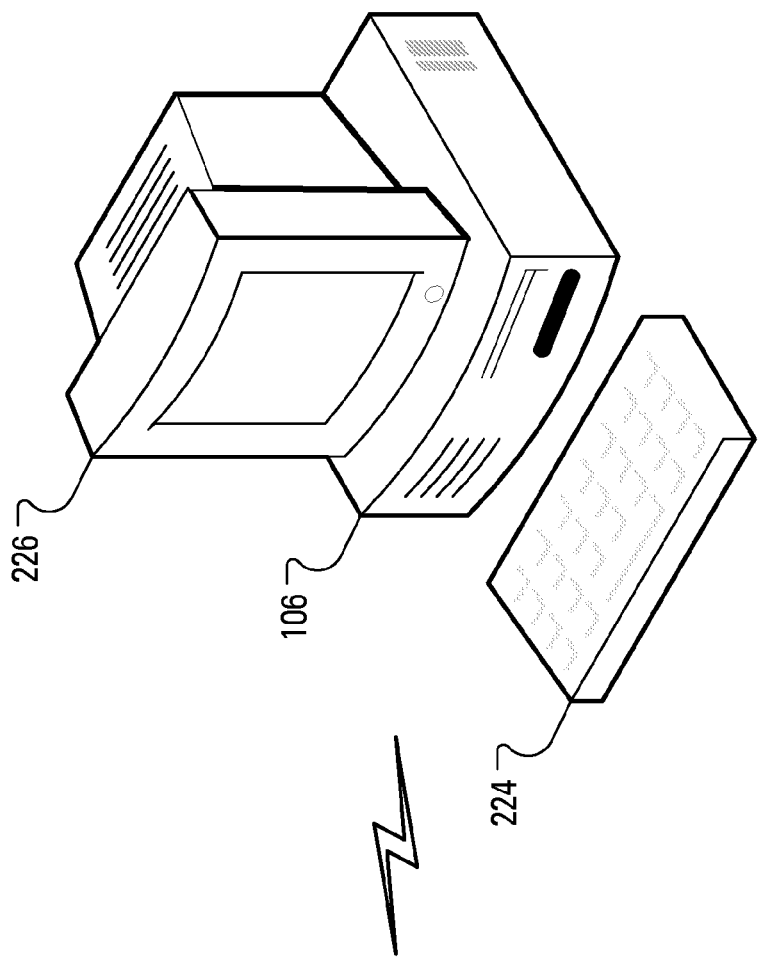
FIG. 1 illustrates an environment in which a smart card is illustrated along with a PC that communicates wirelessly with a smart card reader.
Figure 1:
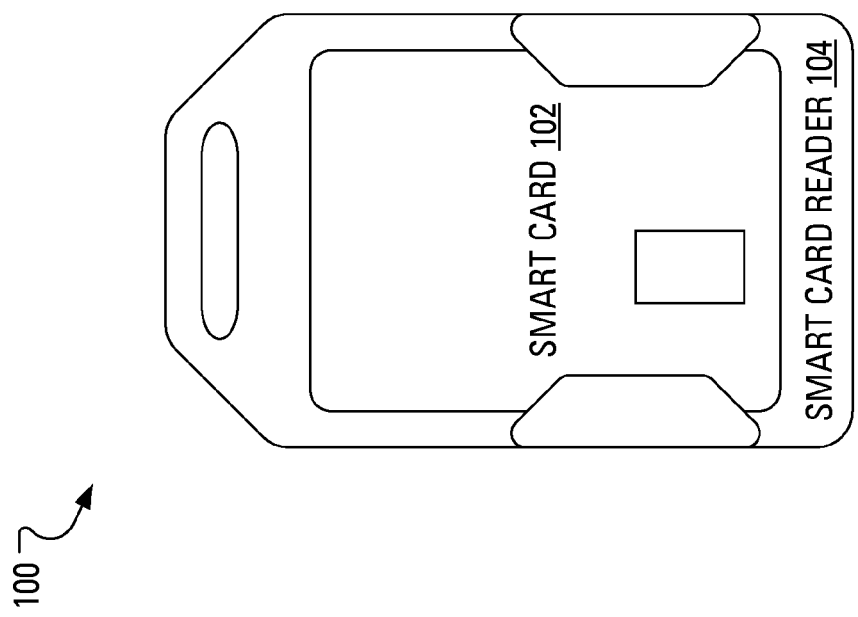

A primary device that reads information from, or writes information to, a smart card typically does so using a peripheral device known as a smart card reader. The smart card reader may be connected, e.g., through a directly wired connection or a wireless connection, to the primary device. Specific software, called a "driver", is generally executed by the primary device to facilitate reading from, and writing to, a memory component of the smart card using the smart card reader. The driver includes an application programming interface (API) that allows other programs to issue requests and commands that will be understood by the driver. An API generally comprises a source code interface that a computer system or program library provides in order to support requests for services to be made of it by a computer program.

When biometric templates are stored on a smart card and a smart card reader is used to obtain a biometric candidate, one or both of the biometric candidate and the biometric template may be required to be transferred from the smart card reader to the primary device. Unfortunately, as the biometric candidate and the biometric template are transferred to the primary device, the security of these biometric items is decreased.

Accordingly, security improvements are desirable in the art of biometric identity verification.

A message that is intended to carry biometric template data from a smart card reader to a device associated therewith may be adapted such that the biometric template data is removed. Advantageously, since the biometric template data does not reach the device, the biometric template data remains secret. Furthermore, a process executing on the device that expects the message may continue to maintain an up-to-date record of the state of the smart card.

In accordance with an aspect of the present application there is provided, at a smart card reader, a method of making secure use of authentication data stored on a smart card by the smart card reader. The method may comprise receiving a response Application Protocol Data Unit (APDU) from the smart card, the response APDU including authentication data from the smart card, the response APDU indicating a destination, extracting the authentication data from the smart card from the response APDU, storing the authentication data from the smart card, generating a filtered response APDU, wherein the filtered response APDU does not include the authentication data from the smart card and transmitting the filtered response APDU toward the destination. In other aspects of the present application, a smart card reader is provided for carrying out this method and a computer readable medium is provided for adapting a processor in a smart card reader to carry out this method.

Other aspects and features of the present disclosure will become apparent to those of ordinary skill in the art upon review of the following description of specific embodiments of the disclosure in conjunction with the accompanying figures.

FIG. 1 illustrates an exemplary communication system 100 that includes a primary device 106, embodied as a desktop personal computer (PC), that is enabled to communicate with a peripheral device 104, embodied as a smart card reader. The primary device 106 may, in various embodiments, be a laptop computer, a handheld mobile communication device or other computing device, etc. A smart card 102 is illustrated mounted in the smart card reader 104. In some embodiments, the smart card 102 may be communicably coupled with the smart card reader 104 via a wireless link. The manner in which the PC 106 communicates with the smart card reader 104 is illustrated as a wireless link, though a person of ordinary skill will recognize that the communication may similarly be accomplished over a wired connection.

Figure 2:
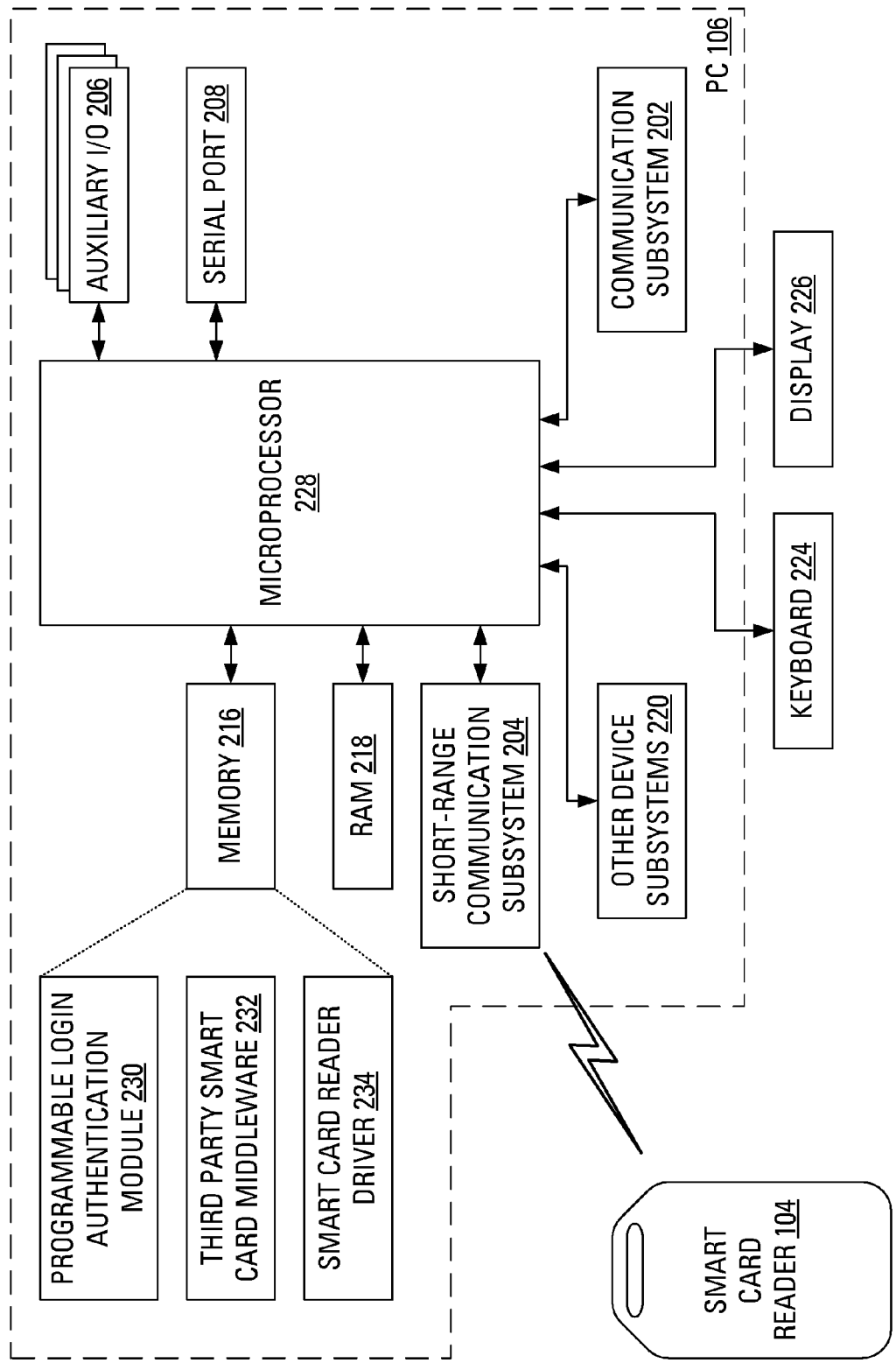
FIG. 2 schematically illustrates components of the PC of FIG. 1.

FIG. 2 illustrates the PC 106 connected to an input device (e.g., a keyboard 224 having a plurality of keys) and an output device (e.g., a display 226). A processing device (a microprocessor 228) is shown schematically in FIG. 2. The microprocessor 228 controls the operation of the display 226, as well as the overall operation of the PC 106, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

In addition to the microprocessor 228, other parts of the PC 106 are shown schematically in FIG. 2. These may include a communications subsystem 202, a short-range communications subsystem 204. The PC 106 may further include other input/output devices such as a set of auxiliary I/O devices 206, a serial port 208. The PC 106 may further include memory devices including a memory 216 and a Random Access Memory (RAM) 218. Furthermore, the PC 106 may include various other device subsystems 220. The PC 106 may have the capability to communicate with other computer systems via the Internet.

Operating system software executed by the microprocessor 228 may be stored in a computer readable medium, such as the memory 216, but may be stored in other types of memory devices, such as a read only memory (ROM) or similar storage element. In addition, system software, specific device applications, or parts thereof, may be temporarily loaded into a volatile store, such as the RAM 218.

The microprocessor 228, in addition to its operating system functions, enables execution of software applications on the PC 106. A predetermined set of software applications that control basic device operations, such as a Programmable Login Authentication Module 230, may be installed on the PC 106. A smart card reader driver 234 may also be installed on the PC 106, to implement aspects of the present disclosure. As well, additional software modules, illustrated as a third party smart card middleware module 232.

Communication functions may be performed through the communication subsystem 202 and through the short-range communications subsystem 204.

The short-range communications subsystem 204 enables communication between the PC 106 and other proximate systems or devices, which need not necessarily be similar devices. For example, the short-range communications subsystem 204 may include a Bluetooth™ communication module to provide for communication with the smart card reader 104 where the smart card reader 104 also implements a Bluetooth™ communication module. As another example, the short-range communications subsystem 204 may include an infrared device to provide for communication with similarly enabled systems and devices.

Figure 3:
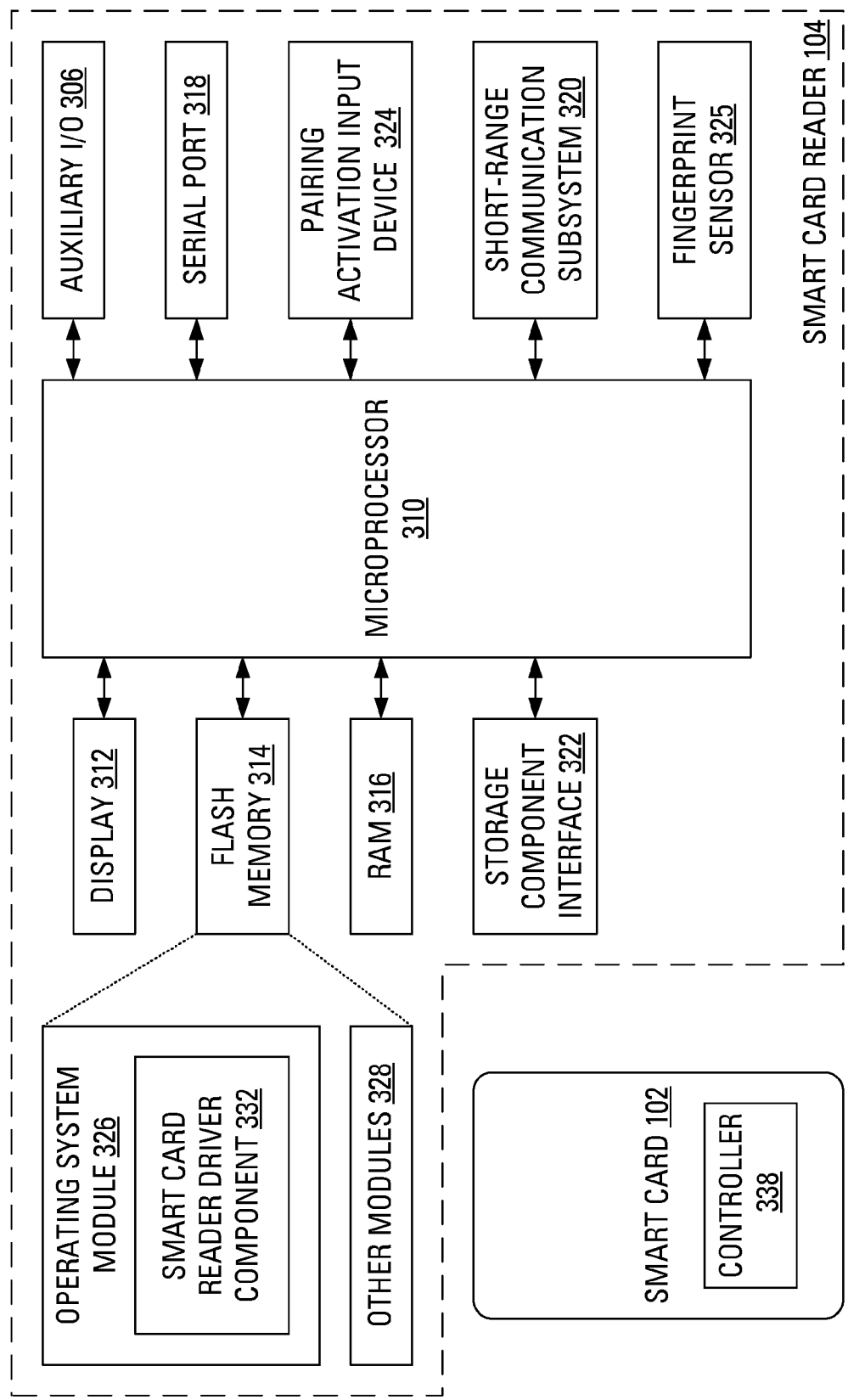
FIG. 3 schematically illustrates components of the smart card reader of FIG. 1.

FIG. 3 illustrates an example embodiment of the smart card reader 104. The smart card reader 104 includes a controller including at least one smart card reader microprocessor 310, which is suitably programmed to control the overall operation and functions of the smart card reader 104. The smart card reader 104 may also include an output device (e.g., a display module 312). The smart card reader 104 may further include peripheral devices or subsystems such as a flash memory 314, a RAM 316, a serial port 318 (e.g., a USB port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and a biometric information input device 325 (e.g., a fingerprint sensor). In some embodiments, the RAM 316 includes a portion allocated to a data cache.

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software application modules indicated generally by reference 328. The operating system module 326 of the smart card reader 104 further includes a smart card reader driver component 332.

The smart card reader driver component 332 is responsible for coordinating communications between the smart card reader 104 and the smart card 102 and/or the smart card reader driver 234 of the PC 106. The operating system module code 326, code for specific device application modules 328, code for the smart card reader driver component 332, or code components thereof, may be temporarily loaded into a volatile storage medium such as the RAM 316. Received communication signals and other data may also be stored in the RAM 316. Additionally, the storage component interface 322 receives the smart card 102, which may provide additional storage space for the smart card reader 104.

In one embodiment, the smart card 102 has a controller 338 responsible for coordinating communications between the smart card 102 and the smart card reader driver component 332 of the smart card reader 104.

The stored program control (i.e., software application modules 328) for the smart card reader microprocessor 310 may include a predetermined set of applications, code components or software modules that control basic device operations, for example, management and security related control of the data of the smart card reader 104, and may be installed on the smart card reader 104 as a component of the software application modules 328 during the manufacturing process. Further applications may also be loaded (i.e., downloaded) onto the smart card reader 104 through the operation of the serial port 318, the smart card reader short-range communications subsystem 320 or from the smart card 102. The downloaded code module or components are then installed by the user (or automatically) in the RAM 316 or non-volatile program memory (e.g., the flash memory 314).

While the smart card reader driver component 332 is shown to be an integrated portion of the operating system 326 for security purposes (e.g., individuals are not permitted to tamper with the smart card reader driver component 332), the smart card reader driver component 332 may be installed as one of the software applications 328 so long as suitable security related precautions are taken to ensure that the smart card reader driver component 332 cannot be modified or tampered with by unauthorized users.

The serial port 318 may be a USB-type interface port for interfacing or synchronizing with another device, such as the PC 106. The serial port 318 may be used to set preferences through an external device or software application or exchange data with a device, such as the PC 106. Such data may be stored on the smart card 102 that is plugged into the storage component interface 322 of the smart card reader 104. The serial port 318 is also used to extend the capabilities of the smart card reader 104 by providing for downloads, to the smart card reader 104, of information or software, including user interface information.

The short-range communications subsystem 320 provides an interface for communication between the PC 106 and the smart card reader 104. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, so long as the short-range communications subsystem 204 (FIG. 2) of the PC 106 operates using the same protocol, thereby facilitating wireless communication between the PC 106 and the smart card reader 104. Any communications mechanism and/or protocol may be implemented for the short-range communications subsystems 204, 320, so long as the PC 106 can communicate with the smart card reader 104 when the PC 106 is no more than a predetermined distance away from the smart card reader 104.

Traditionally, the third party smart card middleware 232 is supplied by the manufacturer of the smart card 102. The operating system of the PC 106 includes an API defining a smart card framework. The third party smart card middleware 232 registers with the operating system of the PC 106 so that calls to smart card framework aspects of the API can be appropriately handled by the smart card reader driver module 234. The third party smart card middleware 232 is configured with appropriate commands for communicating with the smart card 102 and is configured to maintain a record of the state of the smart card 102. To send a command to the smart card 102, the third party smart card middleware 232 interacts with the smart card reader driver module 234.

According to instructions received from the third party smart card middleware 232, the smart card reader driver module 234 may send a command to the smart card reader 104. Eventually, the smart card reader 104 sends a response to the smart card reader driver 234. The smart card reader driver 234 provides the response to the third party smart card middleware 232 and the third party smart card middleware 232 updates the status of the smart card 102.

In computing, "Winlogon" is a component of the Microsoft® Windows® operating systems that is responsible for handling a secure attention key, loading a user profile on logon and, optionally, locking the computer responsive to a locking command or responsive to expiry of a predetermined time-out period (requiring another authentication step). The obtaining and verification of user credentials is left to other components.

Winlogon handles interface functions that are independent of authentication policy. Winlogon creates desktops for the workstation, implements time-out operations, provides a set of support functions for a Programmable Login Authentication Module and takes responsibility for configuring Group Policy for machine and user.

The Programmable Login Authentication Module is a component of some Microsoft Windows operating systems that provides secure authentication and interactive logon services. The Programmable Login Authentication Module is a dynamically linked library (DLL) that is loaded in the context of the Winlogon process when the machine is started. The Programmable Login Authentication Module is responsible for handling a secure attention sequence, typically Control-Alt-Delete, and interacting with the user when this sequence is received. The Programmable Login Authentication Module is also responsible for starting initial processes for a user (such as the Windows Shell) when the user first logs on.

Winlogon is, by default, configured to use a default Login Authentication Module. Winlogon can be configured to use a different Login Authentication Module, thereby providing for non-standard authentication methods and/or providing for a visual user interface that is different than the visual user interface that is provided by the default Login Authentication Module.

A file representative of the Programmable Login Authentication Module DLL is typically located in the System32 folder and can be replaced with a file representative of a customized Programmable Login Authentication Module DLL that provides alternative user identification and authentication procedures, such as those authentication procedures that depend on communication with a biometric peripheral device.

Exemplary non-standard authentication methods may involve a smart card reader and may involve identifying a user based on biometrics. Developers who implement a replacement Programmable Login Authentication Module provide implementations for a set of API calls, which cover functionality such as displaying a "workstation locked" dialog, processing the secure attention sequence in various user states, responding to queries as to whether or not locking the workstation is an allowed action, supporting the collection of user credentials on Terminal Services-based connections and interacting with a screen saver. The Winlogon component is solely responsible for calling these APIs in the Programmable Login Authentication Module.

In one implementation of the system of FIG. 1, the smart card 102 stores a set of fingerprint templates. Additionally, the Programmable Login Authentication Module 230 (see FIG. 2) is configured to allow access to the PC 106 based on authentication of a fingerprint obtained using the fingerprint sensor 325. Responsive to a user providing a finger to the fingerprint sensor 325, authentication involves matching a fingerprint candidate, obtained by the fingerprint sensor 325, against a fingerprint template stored on the smart card 102. If a match is found, then access to the PC 106 is allowed.

It is desirable to keep secret both the fingerprint candidate, obtained by the fingerprint sensor 325, and the fingerprint template, stored on the smart card 102. One strategy for maintaining secrecy of the fingerprint candidate and the fingerprint template is to avoid transmitting either of these over the link to the PC 106. Implementation of this strategy involves determining on the smart card reader 104 whether a match exists between the fingerprint candidate and the fingerprint template. However, a challenge is posed in the implementation of this strategy in that the third party smart card middleware 232 is configured to maintain awareness of the state of the smart card 102 at all times.

Sending a command to the smart card 102 changes the state of the smart card 102. Once the state of the smart card 102 has been altered by a command that did not originate from the third party smart card middleware 232, an attempt, by the third party smart card middleware 232, to access the smart card 102 may fail due to the state of the smart card 102 being distinct from that which has been recorded by the third party smart card middleware 232.

Communication between the PC 106 and the smart card reader 104 and communication between the smart card reader 104 and the smart card 102 may be standardized to use Application Protocol Data Units (APDUs), where a standard structure for an APDU is defined by ISO 7816 "Identification cards—Integrated circuit(s) cards with contacts", which is available from the International Organization for Standardization at www.iso.ch. There are various categories of APDUs, including command APDUs and response APDUs. A command APDU is sent, for instance, by the smart card reader 104 to the smart card 102. A command APDU contains a header and may contain data. A response APDU is sent by the smart card 102 to the smart card reader 104. A response APDU contains a status word and may contain data.

Figure 4:
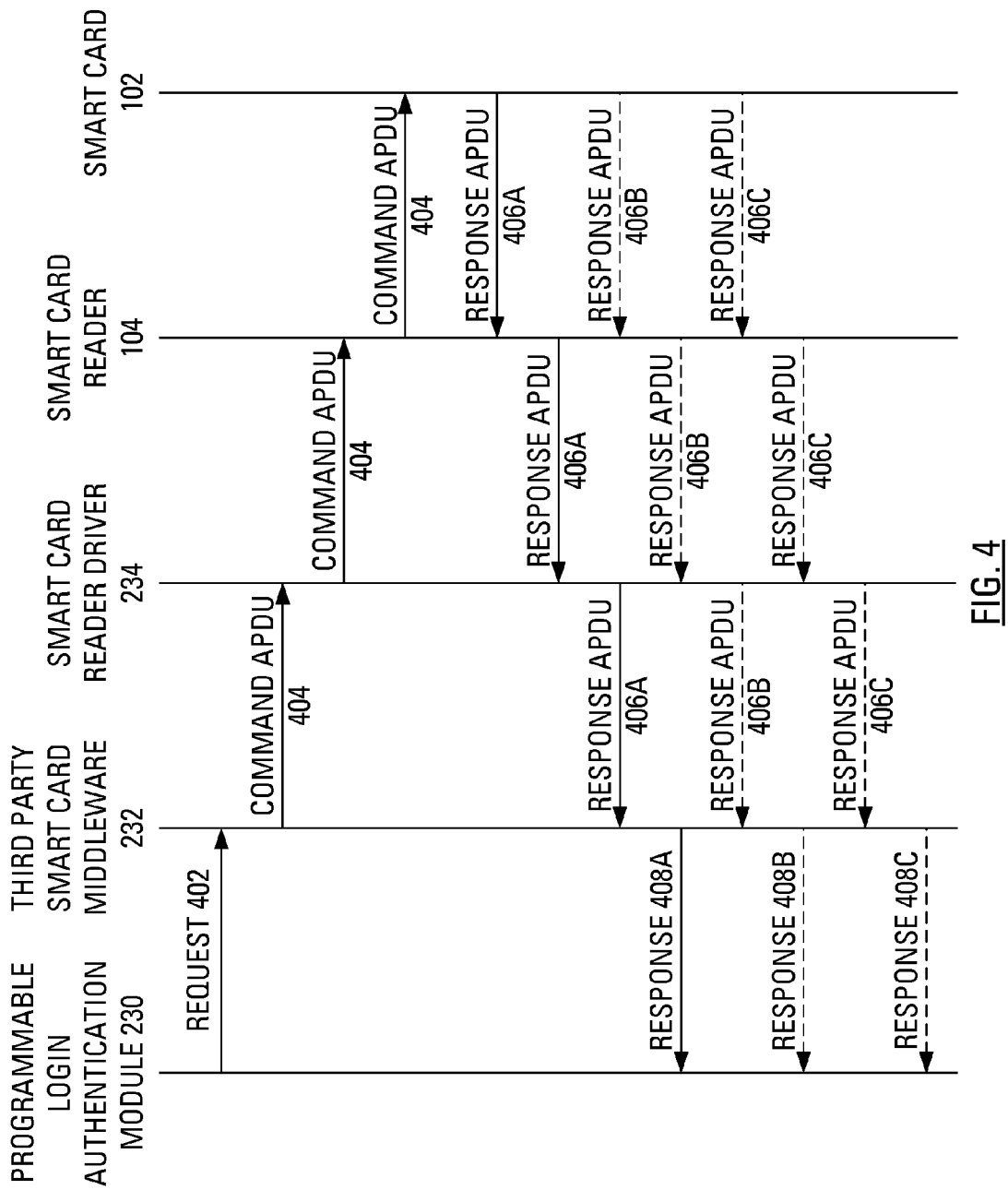
FIG. 4 illustrates message flow in a typical exchange of messages among components of the PC, the smart card reader and the smart card of FIG. 1, where the message flow is directed to the transfer of biometric templates from the smart card to the smart card reader and then to the PC.

A typical exchange of messages is presented in FIG. 4. In anticipation of using biometric authentication to allow access to the PC 106, the Programmable Login Authentication Module 230 may transmit a request 402 to the third party smart card middleware 232, where the request 402 indicates a requirement for a set of fingerprint templates stored on the smart card 102. Responsive to the request 402, the third party smart card middleware 232 generates a request command APDU 404 in a manner that will be understood by the smart card 102. The third party smart card middleware 232 then transmits the request command APDU 404 to the smart card reader driver 234. Responsive to receiving the request command APDU 404, the smart card reader driver 234 arranges the transmission of the request command APDU 404 to the smart card reader 104. Responsive to receiving the request command APDU 404, the smart card reader 104 transmits the request command APDU 404 to the smart card 102.

Responsive to receiving the request command APDU 404, the smart card 102 generates a response APDU 406A that includes a status word and the requested data, e.g., fingerprint template data. The smart card 102 transmits the response APDU 406A to the smart card reader 104. In turn, the smart card reader 104 transmits the response APDU 406A to the PC 106, where the response APDU 406A is received and processed by the smart card reader driver 234. The smart card reader driver 234 transmits the response APDU 406A to the third party smart card middleware 232, where the response APDU 406A is processed and used to generate a response 408A that includes the data (fingerprint template data) from the response APDU 406A. The third party smart card middleware 232 then transmits the response 408A to the Programmable Login Authentication Module 230.

It may be that the entirety of the data requested in the request command APDU 404 does not fit into the structure of the single response APDU 406A. Accordingly, the smart card 102 may respond to the receipt of the request command APDU 404 with multiple response APDUs. Illustrated in FIG. 4 are three response APDUs, that is, two response APDUs in addition to the first response APDU 406A, namely a second response APDU 406B and a third response APDU 406C. The second response APDU 406B and the third response APDU 406C follow the same path to the third party smart card middleware 232, where the APDUs are used to generate a second response 408B and a third response 408C, respectively. Like the first response 408A, the second response 408B and the third response 408C are also transmitted to the Programmable Login Authentication Module 230 by the third party smart card middleware 232.

It should be appreciated by a person of ordinary skill in the art that the smart card 102 may generate many more than one, two or three response APDUs to transfer requested fingerprint template data.

After the series of messages, the Programmable Login Authentication Module 230 has the fingerprint template data from the smart card 102, and the third party smart card middleware 232 has an accurate record of the state of the smart card 102.

Upon receiving notification of a logon attempt, the Programmable Login Authentication Module 230 transmits a fingerprint template to a component that has registered with the microprocessor 228 of the PC 106 as being responsible for fingerprint matching. The transfer of the fingerprint template to such a component for fingerprint matching also triggers transmission of a command to a component for fingerprint candidate obtaining. Notably there are many possibilities for the components. For example, the microprocessor 228 of the PC 106 may be registered as the component responsible for fingerprint matching and a fingerprint sensor, e.g., as an integral component (not shown) of the PC 106 or as a single-purpose peripheral (not shown) connected to the PC 106 by way of the serial port 208, may be registered as the component responsible for fingerprint obtaining.

In the case of the smart card reader 104 as illustrated in FIG. 3, the smart card reader 104 can act as both the component responsible for fingerprint matching and the component responsible for fingerprint obtaining.

Figure 5:
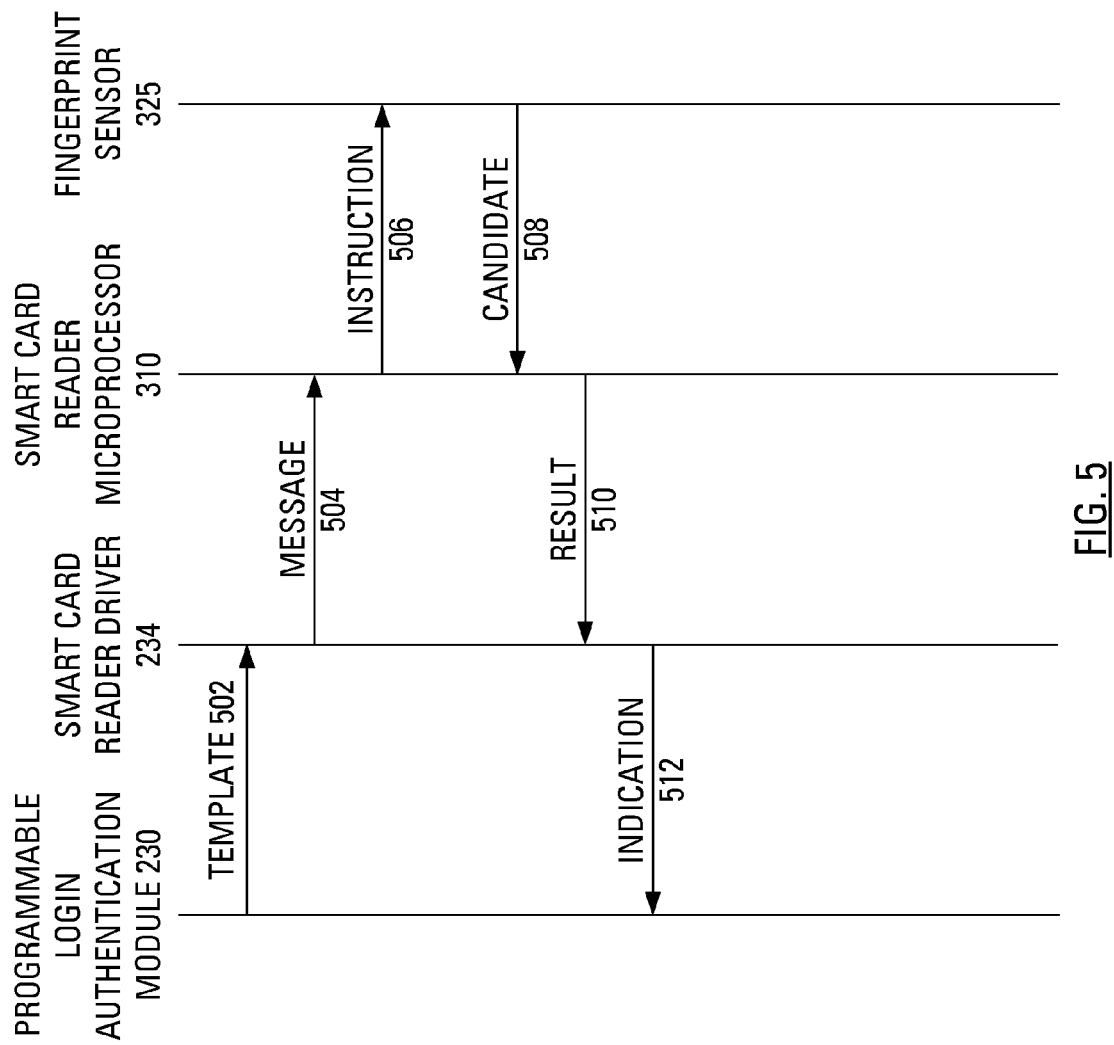
FIG. 5 illustrates message flow in a typical exchange of messages among components of the PC and the smart card reader of FIG. 1, where the message flow is directed to authenticating a potential user of the PC.

Accordingly, and in view of FIG. 5, upon receiving notification of a logon attempt from a user attempting to gain access to the PC 106, the Programmable Login Authentication Module 230 transmits a fingerprint template 502 to the smart card reader driver 234. Responsively, the smart card reader driver 234 transmits a message 504 to the smart card reader 104. The message 504 includes the fingerprint template 502 received from the Programmable Login Authentication Module 230 and a set of commands to: obtain a fingerprint candidate; perform a comparison of the fingerprint candidate with the fingerprint template; and respond with a result of the comparison. The smart card reader microprocessor 310, upon receiving the message 504, transmits an instruction 506 to the fingerprint sensor 325 to obtain a fingerprint candidate. After obtaining a fingerprint candidate from the user attempting to gain access, the fingerprint sensor 325 responds with the obtained fingerprint candidate 508. The smart card reader microprocessor 310 then performs a comparison of the fingerprint template 502 to the fingerprint candidate 508 and transmits a result 510 of the comparison to the PC 106. At the PC 106, the smart card reader driver 234 receives the result 510 and transmits an indication 512 of the result to the Programmable Login Authentication Module 230. Based on the indication 512 of the result of the comparison, the Programmable Login Authentication Module 230 can either permit or deny access to the PC 106 to the user attempting to gain access.

Notably, since the obtaining of a fingerprint comparison result did not involve the smart card 102, the state of the smart card 102 did not change. Additionally, there was no need to communicate through the third party smart card middleware 232.

For those particularly concerned with security of biometric data, there are messages in the message exchanges represented by FIG. 4 and FIG. 5 that raise some alarm. One message of concern is the first response APDU 406A (see FIG. 4), especially as the first response APDU 406A is transmitted wirelessly from the smart card reader 104 to the PC 106. Another message of concern is the message 504 (see FIG. 5), which is transmitted wirelessly from the PC 106 to the smart card reader 104. Each of these messages carries fingerprint template data and, by doing so, each message exposes the fingerprint template data to potential interception. Note that the second response APDU 406B and the third response APDU 406C are also of concern for the same reason.

An additional vulnerability arises by temporarily storing fingerprint template data on the PC 106. The PC 106 is, generally, a more insecure platform than the smart card reader 104. For example, malicious third party software could be installed on the PC 106 so that, when executed, the malicious third party software may read fingerprint template data from the PC memory 216, 218 and transmit the fingerprint template data to an unauthorized receiving party.

For security reasons, then, it appears that it would be desirable to eliminate the transmission of the response APDUs 406 from the smart card reader 104 to the PC 106. However, at least two problems arise when the response APDUs 406 are not provided to the PC 106. The first problem relates to the third party smart card middleware 232. If the fingerprint template data are read from the smart card 102, then the smart card 102 will change state. If the third party smart card middleware 232 does not receive a response APDU that includes a corresponding status update word, the third party smart card middleware 232 will be maintaining an incorrect record of the current state of the smart card 102. The incorrect state may lead to problems in later operation if later operation involves access to the smart card 102. The second problem relates to the Programmable Login Authentication Module 230. Future operation of the Programmable Login Authentication Module 230 has been based on the Programmable Login Authentication Module 230 maintaining a set of fingerprint template data.

In overview, it is proposed herein to alter the Programmable Login Authentication Module 230 so that maintenance of fingerprint template data by the Programmable Login Authentication Module 230 is not necessary and to filter response APDUs at the smart card reader 104 so that fingerprint template data are not transmitted from the smart card reader 104 to the PC 106. With reduced traffic of fingerprint template data between the smart card reader 104 and the PC 106, the security of the fingerprint data in general is improved.

More particularly, it is proposed herein to implement filtering at the smart card reader microprocessor 310. The filtering is to be configured to apply to response APDUs received from the smart card 102 and, perhaps, may be configured to apply to command APDUs received from the PC 106. The smart card reader microprocessor 310 is to alter the response APDU to extract fingerprint template data from the response APDU before transmitting a filtered response APDU to the PC 106.

Figure 6:
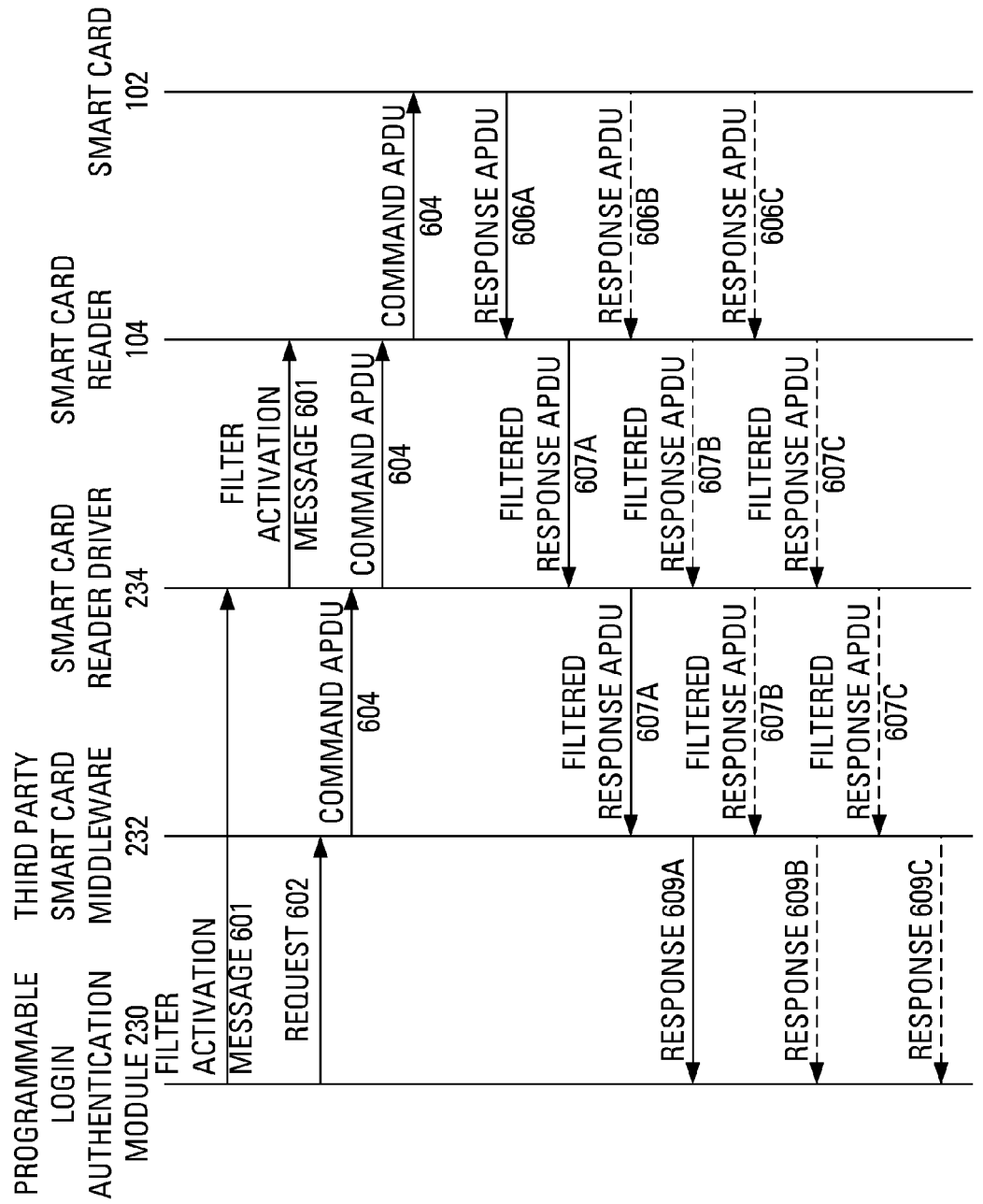
FIG. 6 illustrates message flow in a novel exchange of messages among components of the PC, the smart card reader and the smart card of FIG. 1, where the message flow is directed to the transfer of biometric templates from the smart card to the smart card reader.

Consider a message exchange in FIG. 6, which is based on the message exchange presented in FIG. 4. Notably, due to the filtering at the smart card reader 104, the Programmable Login Authentication Module 230 will not be receiving fingerprint template data read from the smart card in response to requesting the fingerprint template data. Accordingly, the Programmable Login Authentication Module 230 may adapted so as to not expect that a request for fingerprint template data will actually result in receipt of fingerprint template data. As part of the adaptation of the Programmable Login Authentication Module 230, the Programmable Login Authentication Module 230 may be configured to send a filter activation message 601 to the smart card reader driver 234 ahead of sending a fingerprint template request message 602 to the third party smart card middleware 232. Upon receipt, the smart card reader driver 234 may directly forward the filter activation message 601 to the smart card reader 104.

Responsive to receiving the fingerprint template request 602, the third party smart card middleware 232 generates a request command APDU 604 in a manner that will be understood by the smart card 102. The third party smart card middleware 232 then transmits the request command APDU 604 to the smart card reader driver 234. Responsive to receiving the request command APDU 604, the smart card reader driver 234 arranges the transmission of the request command APDU 604 to the smart card reader 104. Responsive to receiving the request command APDU 604, the smart card reader 104 transmits the request command APDU 604 to the smart card 102.

Figure 7:
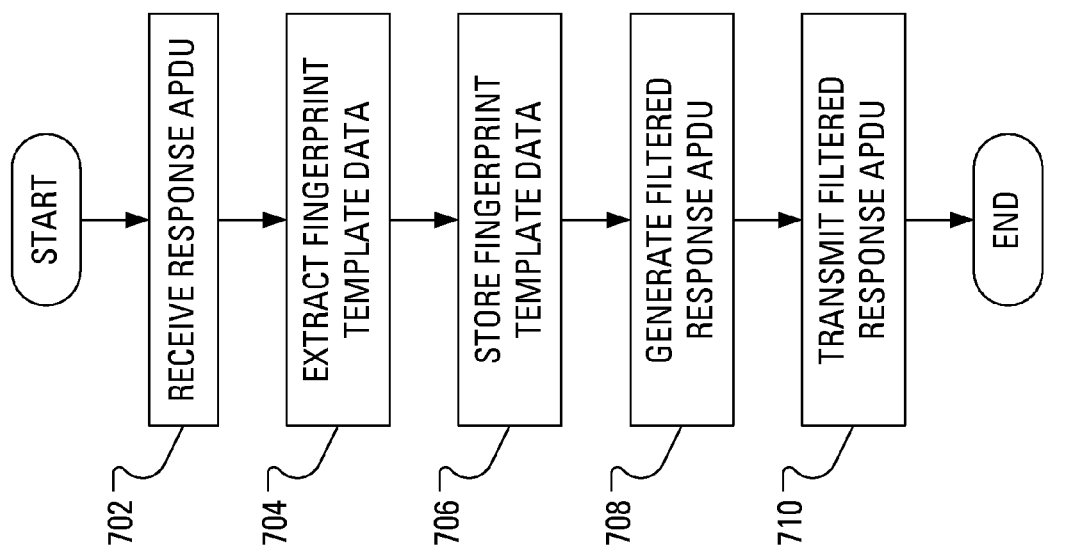
FIG. 7 example steps in a method for execution at the smart card reader of FIG. 1, where the method relates to filtering response messages received from the smart card.

Responsive to receiving the request command APDU 604, the smart card 102 generates a response APDU 606A that includes a status word and the requested data, e.g., fingerprint template data. The smart card 102 transmits the response APDU 606A to the smart card reader 104. The microprocessor 310 of the smart card reader 104 then carries out a filtering method, example steps of which are presented in FIG. 7.

Initially, the microprocessor 310 receives (step 702) the response APDU 606A. Responsive to receiving the response APDU 606A, the microprocessor 310 extracts (step 704) the fingerprint template data from the response APDU 606A and stores (step 706) the fingerprint template data locally on the smart card reader 104, e.g., in the RAM 316 (see FIG. 3). The microprocessor 310 then generates (step 708) a filtered response APDU 607A. Once the filtered response APDU 607A has been generated, the microprocessor 310 transmits (step 710) the filtered response APDU 607A to the PC 106.

The filtered response APDU 607A generated (step 708) by the microprocessor 310 may take one of several forms. It is typical that a response APDU should have a header section that includes an indication of a length of a payload section. After extraction of the fingerprint template data, the microprocessor 310 may generate the filtered response APDU 607A to include an indication of a zero length payload section. Alternatively, the microprocessor 310 may generate the filtered response APDU 607A to include a payload of usual length but, rather than carrying fingerprint template data, the payload may carry a null. That is, the payload may be filled with zero values. Further alternatively, the microprocessor 310 may arrange the payload of the filtered response APDU 607A to carry dummy fingerprint template data. Dummy fingerprint template data may be a fingerprint template constructed from random values or may be an actual fingerprint template chosen such that exposure of the actual fingerprint template does not reduce the security of the communication system 100 of FIG. 1.

Upon receipt of the filtered response APDU 607A at the PC 106, the filtered response APDU 607A is processed by the smart card reader driver 234. The smart card reader driver 234 transmits the filtered response APDU 607A to the third party smart card middleware 232, which processes the filtered response APDU 607A to generate a filtered response 609A that includes whatever payload, if any, has been inserted into the filtered response APDU 607A by the microprocessor 310 at the smart card reader 104. The third party smart card middleware 232 then transmits the filtered response 609A to the Programmable Login Authentication Module 230.

Advantageously, by processing the filtered response APDU 607A, the third party smart card middleware 232 maintains an accurate record of the state of the smart card 102.

It may be that the entirety of the data requested in the request command APDU 604 does not fit into the structure of the single response APDU 606A. Accordingly, the smart card 102 may respond to the receipt of the request command APDU 604 with multiple response APDUs. Illustrated in FIG. 6 are three response APDUs, that is, two response APDUs in addition to the first response APDU 606A, namely a second response APDU 606B and a third response APDU 606C. The second response APDU 606B and the third response APDU 606C are also processed by the microprocessor 310 of the smart card reader to lead to a second filtered response APDU 607B and a third filtered response APDU 607C, respectively. The smart card reader 104 transmits the second filtered response APDU 607B and the third filtered response APDU 607C to the PC 106. At the PC 106, the filtered response APDUs 607 reach the third party smart card middleware 232, where the APDUs are used to generate a second filtered response 609B and a third filtered response 609C, respectively. Like the first filtered response 609A, the second filtered response 609B and the third filtered response 609C are also transmitted to the Programmable Login Authentication Module 230 by the third party smart card middleware 232. Without regard to whether a given response APDU 606 contains an entire fingerprint template or just a portion of a fingerprint template, the response APDU may be considered to include data related to a biometric template, more specifically, data related to a fingerprint template.

It is notable that, according to the above mode of operation, the Programmable Login Authentication Module 230 does not store fingerprint template data from the smart card 102. As such, upon receiving notification of a logon attempt from a user attempting to gain access to the PC 106, rather than transmit a fingerprint template (as shown as fingerprint template 502 in FIG. 5), the Programmable Login Authentication Module 230 transmits a fingerprint template index message 802 (see FIG. 8) to the smart card reader driver 234. It is expected that the fingerprint template data extracted and stored by the microprocessor 310 of the smart card reader 104 is indexed in such a manner that a particular finger may be referenced. Therefore, the Programmable Login Authentication Module 230 can cause the display 226 of the PC 106 to present a dialog requesting a particular finger be swiped at the fingerprint sensor 325 of the smart card reader 104. Correspondingly, the fingerprint template index message 802 can identify an index of the particular finger.

Upon receiving the fingerprint template index message 802, the smart card reader driver 234 transmits a fingerprint template index message 804 to the smart card reader 104.

The fingerprint template index message 804 includes the fingerprint template index 802 received from the Programmable Login Authentication Module 203 and a set of commands to: obtain a fingerprint candidate; perform a comparison of the fingerprint candidate with the stored fingerprint template corresponding to the fingerprint template index 802; and respond with a result of the comparison. The smart card reader microprocessor 310, upon receiving the fingerprint template index message 804, transmits an instruction 806 to the fingerprint sensor 325 to obtain a fingerprint candidate. After obtaining a fingerprint candidate from the user attempting to gain access, the fingerprint sensor 325 responds with the obtained fingerprint candidate 808. The smart card reader microprocessor 310 then performs a comparison of the indexed stored fingerprint template to the fingerprint candidate 808 and transmits a result 810 of the comparison to the PC 106. At the PC 106, the smart card reader driver 234 receives the result 810 and transmits an indication 812 of the result to the Programmable Login Authentication Module 230. Based on the indication 812 of the result of the comparison, the Programmable Login Authentication Module 230 can either permit or deny access to the PC 106 to the user attempting to gain access.

As discussed briefly above, the third party smart card middleware 232 is specific to the manufacturer of the smart card 102. Accordingly, the PC 106 may have a library of third party smart card middleware modules, one third party smart card middleware module for each of a set of smart manufacturers. Often the manufacturers differ in the content that is placed in command APDUs by the third party smart card middleware and in the content that is placed in response APDUs by the smart card 102. As such, it is anticipated that a single filtering implementation executed on the microprocessor 310 of the smart card reader 104 will not be suitable for filtering response APDUs from smart cards produced by all smart card manufacturers. It is, therefore, expected that manufacturer-specific filtering implementations may be utilized on the smart card reader 104 in the same way that manufacturer-specific third party smart card middleware modules are utilized on the PC 106.

A given filtering implementation can be queried to determine whether the given filter is suitable to filter response APDUs for a particular type of smart card. A filter manager executed on the microprocessor 310 of the smart card reader 104 can query each filtering implementation, also executed on the microprocessor 310 to respond with an "answer-to-reset" code. The filter manager can also query a given smart card for the "answer-to-reset" code. If the filter manager determines a match among the two "answer-to-reset" codes, the given filtering implementation is considered suitable to filter response APDUs generated at the given smart card.

In some instances, it may be advantageous to configure the microprocessor 310 of the smart card reader 104 to intercept command APDUs, before the command APDUs are transmitted from the smart card reader 104 to the smart card 102. The microprocessor 310 may alter an intercepted command APDU to generate a filtered command APDU and then transmit the filtered command APDU to the smart card 102.

Beneficially, a given filtering implementation executed on the microprocessor 310 of the smart card reader 104 may be configured to determine that there has been a problem obtaining a fingerprint candidate.

Although the biometric candidates and biometric templates discussed in the foregoing are based on fingerprints, it should be appreciated by a person of skill in the art that the systems and methods outlined hereinbefore apply equally to other biometrics, such as those based on retinas, irises, facial patterns, hand measurements, signature, gait, typing patterns and voice.

It should similarly be appreciated that the data from the smart card that is extracted from a response APDU and stored at the smart card reader need not necessarily comprise data related to a biometric template. There may be situations in which it may be advantageous to extract other types of authentication data from the smart card, e.g., social security number, digital photograph, and store the data from the smart card before transmitting a filtered response APDU to the destination.

The above-described embodiments of the present application are intended to be examples only. Alterations, modifications and variations may be effected to the particular embodi-

What is claimed is:

1. At a smart card reader, a method of making secure use of authentication data stored on a smart card read by said smart card reader, said method comprising:
receiving a response Application Protocol Data Unit (APDU) from said smart card, said response APDU including data related to a primary biometric template from said smart card, said response APDU indicating a destination;
extracting said data related to said primary biometric template from said smart card from said response APDU;
storing said data related to said primary biometric template from said smart card;
generating a filtered response APDU, wherein said filtered response APDU comprises a payload; wherein said payload carries data related to a secondary biometric template and wherein said data related to said secondary biometric template is distinct from said data related to said primary biometric template; and
transmitting said filtered response APDU toward said destination.

2. The method of claim 1 wherein said filtered response APDU comprises a header.

3. The method of claim 1 wherein said data related to said primary biometric template comprises data related to a fingerprint template.

4. The method of claim 1 further comprising:
receiving a command APDU from said destination; and
generating a filtered command APDU based on said command APDU.

5. A smart card reader comprising:
a storage component interface adapted to communicate with a smart card to receive a response Application Protocol Data Unit (APDU) from said smart card, said response APDU including data related to a primary biometric template from said smart card, said response APDU indicating a destination;
a processor for executing a filter to extract said data related to said primary biometric template from said smart card from said response APDU and generate a filtered response APDU, wherein said filtered response APDU comprises a payload; wherein said payload carries data related to a secondary biometric template and wherein said data related to said secondary biometric template is distinct from said data related to said primary biometric template;
memory adapted to store said data related to said primary biometric template from said smart card; and
a short range communication subsystem adapted to transmit said filtered response APDU toward said destination.

6. The smart card reader of claim 5 wherein said filtered response APDU comprises a header.

7. The smart card reader of claim 5 where said data related to said primary biometric template comprises data related to a fingerprint template.

8. The smart card reader of claim 5 wherein:
said short range communication subsystem is further adapted to receive a command APDU from said destination; and
said processor is adapted to execute a further filter to generate a filtered command APDU based on said command APDU.

9. A computer-readable medium containing computer-executable instructions that, when performed by processor in a smart card reader, cause said processor to:
receive a response Application Protocol Data Unit (APDU) from a smart card, said response APDU including data related to a primary biometric template from said smart card, said response APDU indicating a destination;
extract said data related to said primary biometric template from said smart card from said response APDU;
store said data related to said primary biometric template from said smart card;
generate a filtered response APDU, wherein said filtered response APDU comprises a payload; wherein said payload carries data related to a secondary biometric template and wherein said data related to said secondary biometric template is distinct from said data related to said primary biometric template; and
transmit said filtered response APDU toward said destination.

10. The computer-readable medium of claim 9 wherein said filtered response APDU comprises a header.

11. The computer-readable medium of claim 9 wherein said data related to said primary biometric template comprises data related to a fingerprint template.

12. The computer-readable medium of claim 9 wherein said computer-executable instructions further cause said processor to:
receive a command APDU from said destination; and
generate a filtered command APDU based on said command APDU.

* * * * *